United States Patent [19]
Smith

[11] Patent Number: 5,833,435
[45] Date of Patent: Nov. 10, 1998

[54] INLET NOSE CONE ASSEMBLY AND METHOD FOR REPAIRING THE ASSEMBLY

[75] Inventor: James R. Smith, Middletown, Conn.

[73] Assignee: United Technologies Corporation, Hartford, Conn.

[21] Appl. No.: 773,041

[22] Filed: Dec. 24, 1996

[51] Int. Cl.$^6$ .................................................. B64C 11/14
[52] U.S. Cl. ...................... 416/94; 416/245 R; 29/889.1; 156/98; 156/153; 156/267; 156/293
[58] Field of Search ........................... 416/245 R, 245 A, 416/244 A, 93 R, 93 A, 94; 415/218.1, 219.1; 156/98, 153, 267, 293, 294; 29/889.1; 428/34.1, 35.9, 63, 408, 902

[56] References Cited

U.S. PATENT DOCUMENTS

| | | | |
|---|---|---|---|
| 4,957,415 | 9/1990 | Paul et al. | 416/245 R |
| 5,252,160 | 10/1993 | Scanlon et al. | 416/245 R |
| 5,307,623 | 5/1994 | Antuna et al. | 416/245 R |
| 5,573,378 | 11/1996 | Barcza | 416/245 R |

FOREIGN PATENT DOCUMENTS

| | | | |
|---|---|---|---|
| 372366 | 5/1973 | U.S.S.R. | 416/245 R |

*Primary Examiner*—Christopher Verdier
*Attorney, Agent, or Firm*—Gene D. Fleischhauer

[57] ABSTRACT

An assembly for a rotating composite inlet nose cone is reinforced or is repaired after having undergone delamination. The assembly strengthens the inlet nose cone and thus blocks delaminations of the inlet nose cone. In one particular embodiment, the assembly includes an outer ring that blocks delaminations in an undamaged rotating inlet nose cone. The outer ring has a higher stiffness to mass ratio than the adjacent portion of the inlet nose cone assembly. In one detailed embodiment, an inner ring is disposed inwardly of the adjacent portion of the inlet nose cone assembly. The inner ring in one detailed embodiment has a lower stiffness to mass ratio than the outer ring.

24 Claims, 5 Drawing Sheets

INLET NOSE CONE ASSEMBLY AND METHOD FOR REPAIRING THE ASSEMBLY

TECHNICAL FIELD

This invention relates to axial flow rotary machines such as gas turbine engines, and more particularly to an inlet nose cone assembly for a gas turbine engine such as a turbofan engine.

BACKGROUND ART

The turbofan engine is the most widely used powerplant on large aircraft today. A typical turbofan engine has a compression section, a combustion section and a turbine section. An annular, primary flowpath for working medium gases extends axially through the compression section, combustion section and the turbine section. An annular, secondary flowpath is disposed radially outward of the primary flowpath.

The compression section includes a low pressure compressor and a high pressure compressor. The low pressure compressor has a plurality of stages, the first stage of which is generally known as the fan stage. A fan duct extends circumferentially about the low pressure compressor to bound the secondary flow path.

Working medium gases are drawn into the engine along the primary and secondary flow paths. The gases are passed through the fan stage and the low pressure compressor where the gases are compressed to raise the temperature and the pressure of the working medium gases. A portion of the gases are flowed through the secondary flowpath, inwardly of the fan duct, and do not pass through the later stages of the low pressure compressor.

A large percentage of the thrust produced by a conventional turbofan engine is generated by the gases passing through the fan ducts. The ratio of gases flowing through the fan ducts to the gases flowing through the engine core is known as the bypass ratio. The bypass ratio may be a different value for each individual engine model according to the performance requirements of the power plant. In a large commercial turbofan engine, the bypass ratio may be as high as 6.5 to 1.

In order for the fan stage to operate efficiently in compressing the working medium gases, the gases must enter the fan stage smoothly with a minimum of perturbations. To accomplish this smooth airflow, an inlet nose cone is attached to the fan stage to gradually turn the working medium gases into the fan stage.

The inlet nose cone is generally constructed of a light weight composite material to reduce weight, an important consideration for aircraft power plants. An aircraft powerplant, such as a turbofan engine, must produce sufficient power to enable an aircraft to fly. The lighter the aircraft and its attached engine, the smaller the quantity of power required to enable the aircraft to fly. Thus, the reduction of the inlet nose cone weight results in a smaller power requirement for flight.

Use of the inlet nose cone for an extended period of time may cause the aft portion of the inlet nose cone, also known as the aft fairing, to radially deflect. Continuous deflections of the aft fairing can cause the composite material to delaminate or separate from adjacent layers especially if the inlet nose cone has been damaged during handling or as a result of ingesting foreign matter into the engine. These pieces of the inlet nose cone may be ingested into the primary flowpath of the engine, decreasing the overall engine performance. Delamination also decreases the effectiveness of the inlet nose cone by creating disturbances in the flow path of the working medium gases that adversely affect performance of the engine.

Several approaches have been used to solve this problem. One approach is to wrap a fibrous glass material around the delaminated aft fairing of the inlet nose cone. This procedure gives the inlet nose cone increased damage tolerance and added strength in the transverse direction. While this procedure repairs the damage to the inlet nose cone, it does not reduce future occurrences of delamination. The repaired inlet nose cone is still susceptible to delaminations in the future.

Another approach is to inject resin between the separated composite layers to bond the layers back together and restore the original configuration. This procedure delays separation from progressing and bonds together the delaminated composite layers. However, delaminations may occur in the future.

Yet another approach is to replace material in the flange and aft fairing and to provide at least one layer of fibrous kevlar material in tension around the aft fairing to protect the fairing against handling and foreign object damage. This procedure repairs the damage that occurred and stiffens the aft fairing of the composite inlet nose cone and reduces stress. The fibrous kevlar material exerts a tensile force upon the composite material of the aft fairing. The tensile force places stress on the bonds between the layers of the composite material and can lead to delaminations, the very problem sought to be prevented.

The above art notwithstanding, scientists and engineers working under the direction of Applicant's Assignee have sought to develop alternate procedures for strengthening the inlet nose cone or repairing a composite inlet nose cone which has a delaminated aft fairing.

SUMMARY

This invention is in part predicated upon the recognition that a composite inlet nose cone having an aft fairing subjected to impact damage which is followed by radial deflections in the aft fairing that induce strain in that location may have separation of the adjacent layers of the composite material and subsequent loss of engine efficiency.

According to the present invention, an inlet nose cone formed of composite material having an aft fairing extending in cantilevered fashion from the inlet nose cone further includes a circumferentially continuous outer ring encircling the aft fairing that has a higher stiffness to mass ratio than the aft fairing to constrain the aft fairing against radial deflection.

In accordance with one embodiment of the present invention, an inner ring is attached to the bottom surface of the aft fairing of the inlet nose cone and the bottom surface of the outer ring.

In accordance with one of the detailed embodiments of the present invention, the outer ring is a one-piece assembly that attaches to the aft fairing of the inlet nose cone and straddles the flange.

A primary feature of the present invention is an inlet nose cone assembly having an aft fairing. Another feature is a flange that extends radially inward from the inlet nose cone. The flange is attached to adjacent engine structure. Another feature is an outer ring encircling the aft fairing and a portion of the inlet nose cone. In one detailed embodiment, the present invention also features an inner ring constructed in the form of a frustoconical section having two surfaces. The first surface is bonded to the bottom surface of the aft fairing and the second surface is bonded to the bottom surface of the outer ring.

A primary advantage of the present invention is the increased engine efficiency that results from a smooth flowpath for the working medium gases. Still another advantage of the present invention is a reduction in the cost of ownership of the engine that results from the enhanced durability of the composite inlet nose cone having an outer ring encircling the aft fairing. The outer ring applies a compressive force under operative conditions to the aft fairing that reduces the occurrences of delaminations and increases the durability of the inlet nose cone assembly.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
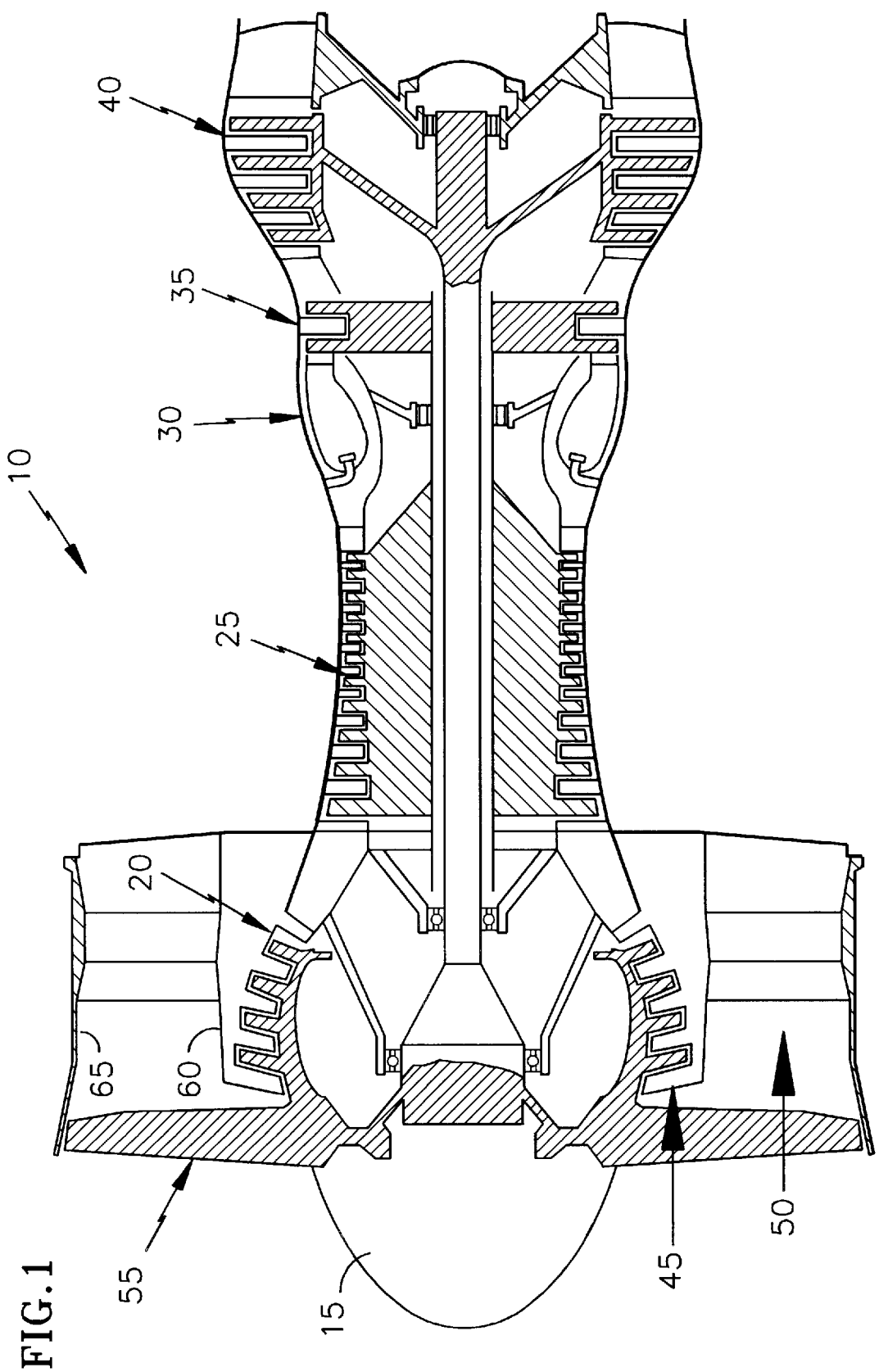
FIG. 1 a cross sectional view of a turbofan engine

Referring to FIG. 1, a turbofan gas turbine engine 10 is shown in perspective view. The engine includes a low pressure compressor 20, a high pressure compressor 25, a combustor 30, a high pressure turbine 35 and a low pressure turbine 40. The engine also has a primary flowpath 45 and a secondary flowpath 50 for working medium gases.

The low pressure compressor 20 includes a fan section 55, an inner fan case 60, and an outer fan case 65. The inner fan case 60 extends circumferentially about the primary flowpath 45 to bound the flowpath at its outermost portion. The secondary flowpath 50 extends radially outward of the primary flowpath 45 through the fan section 55 and is bounded at its outermost portion by the outer fan case 65.

Figure 2:
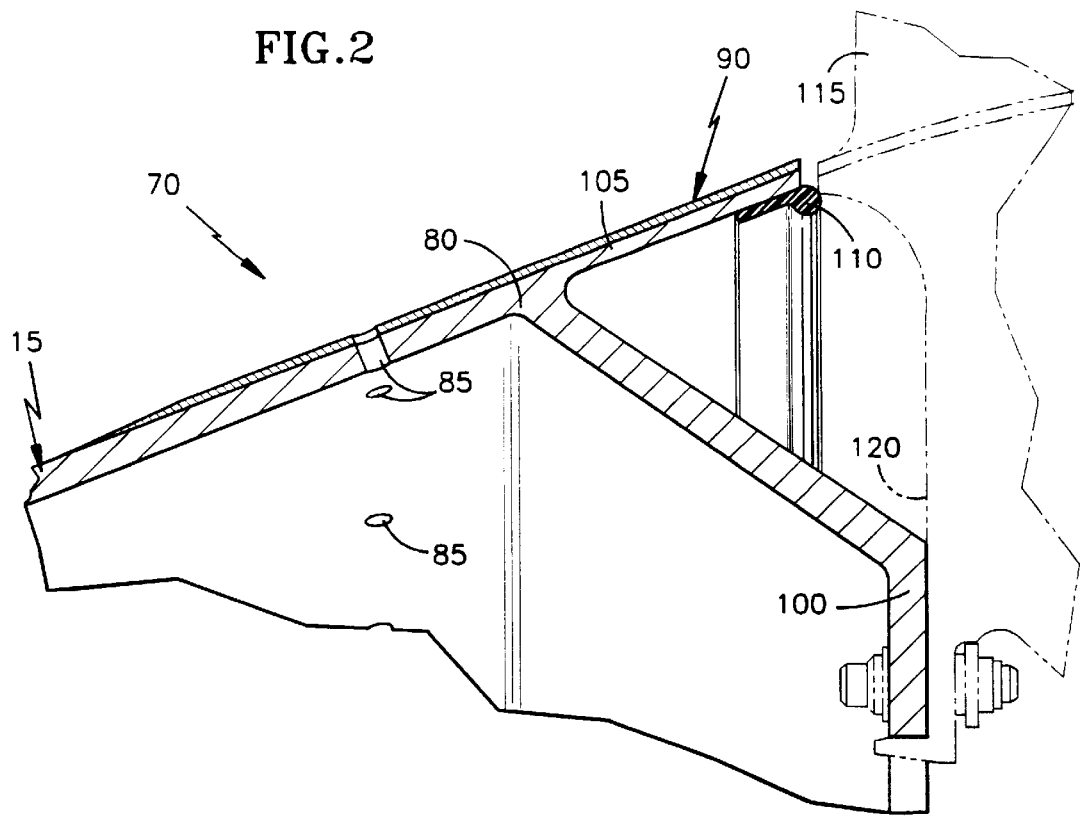
FIG. 2 a cross sectional view of a composite inlet nose cone assembly of the present invention.

FIG. 2 shows a cross sectional view of one embodiment of an inlet nose cone assembly 70 of the present invention. The assembly includes an inlet nose cone 15 having a first circumferentially extending location 80 and circumferentially located vent holes 85. The assembly also includes an outer ring 90, a flange 100, and an aft fairing 105. A bubble airseal 110 extends rearwardly, also shown in phantom is a portion of the fan section 55 that includes a fan blade 115 and a fan rotor disk 120. The flange 100 extends radially inward from the first circumferentially extending location 80 of the inlet nose cone 15. The flange is attached to the fan rotor disk 120.

The aft fairing 105 is integral with the inlet nose cone 15 and extends rearwardly in cantilevered fashion from the first circumferentially extending location 80 to within close proximity of the fan rotor disk 120. The inlet nose cone 15 and the aft fairing 105 are composed of a composite material having a first stiffness to mass ratio. The bubble airseal is located under the aft fairing 105 and makes abutting contact with the fan blade 115.

Figure 2A:
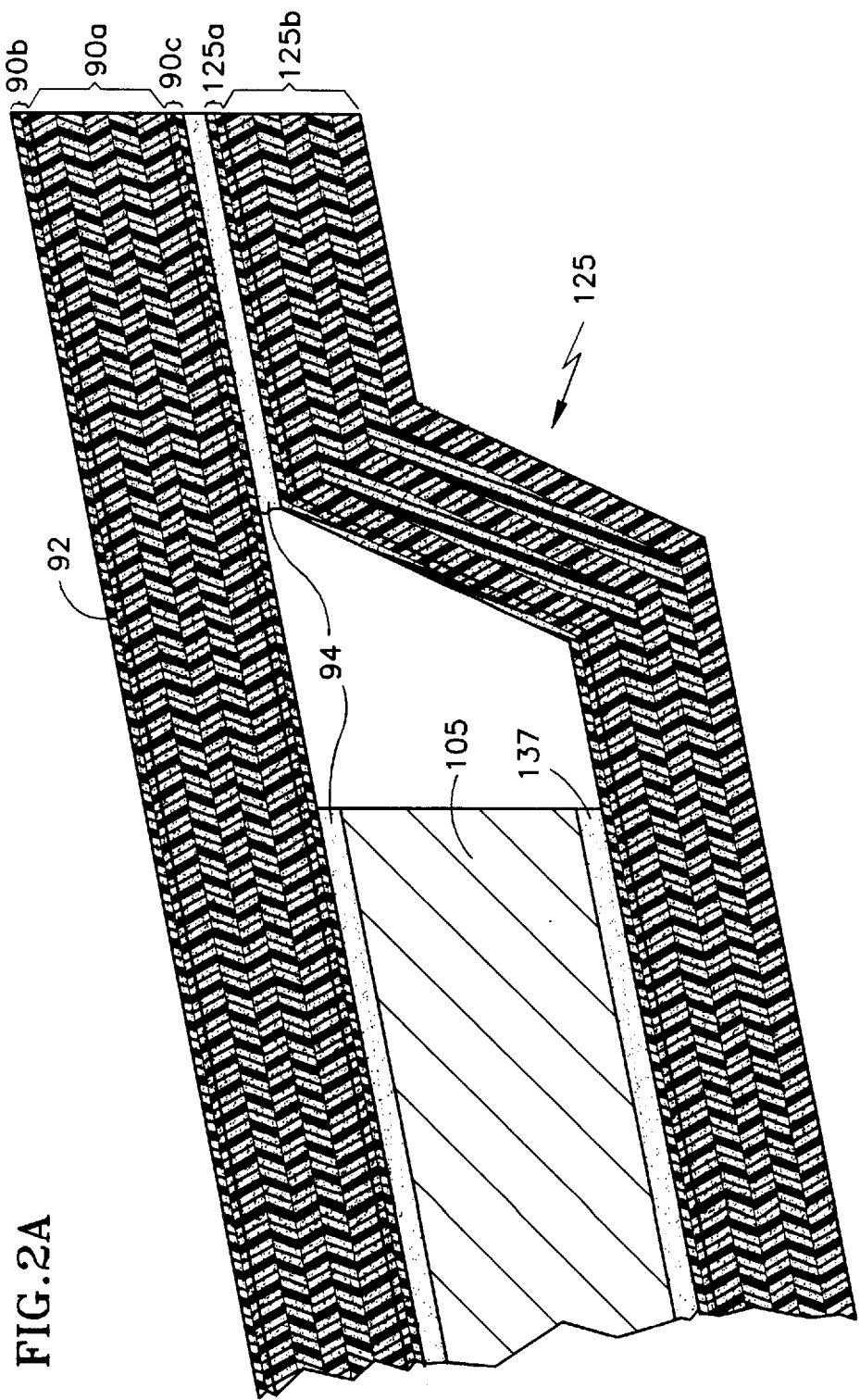
FIG. 2A is an enlarged view of a portion of FIG. 2.
Figure 2B:
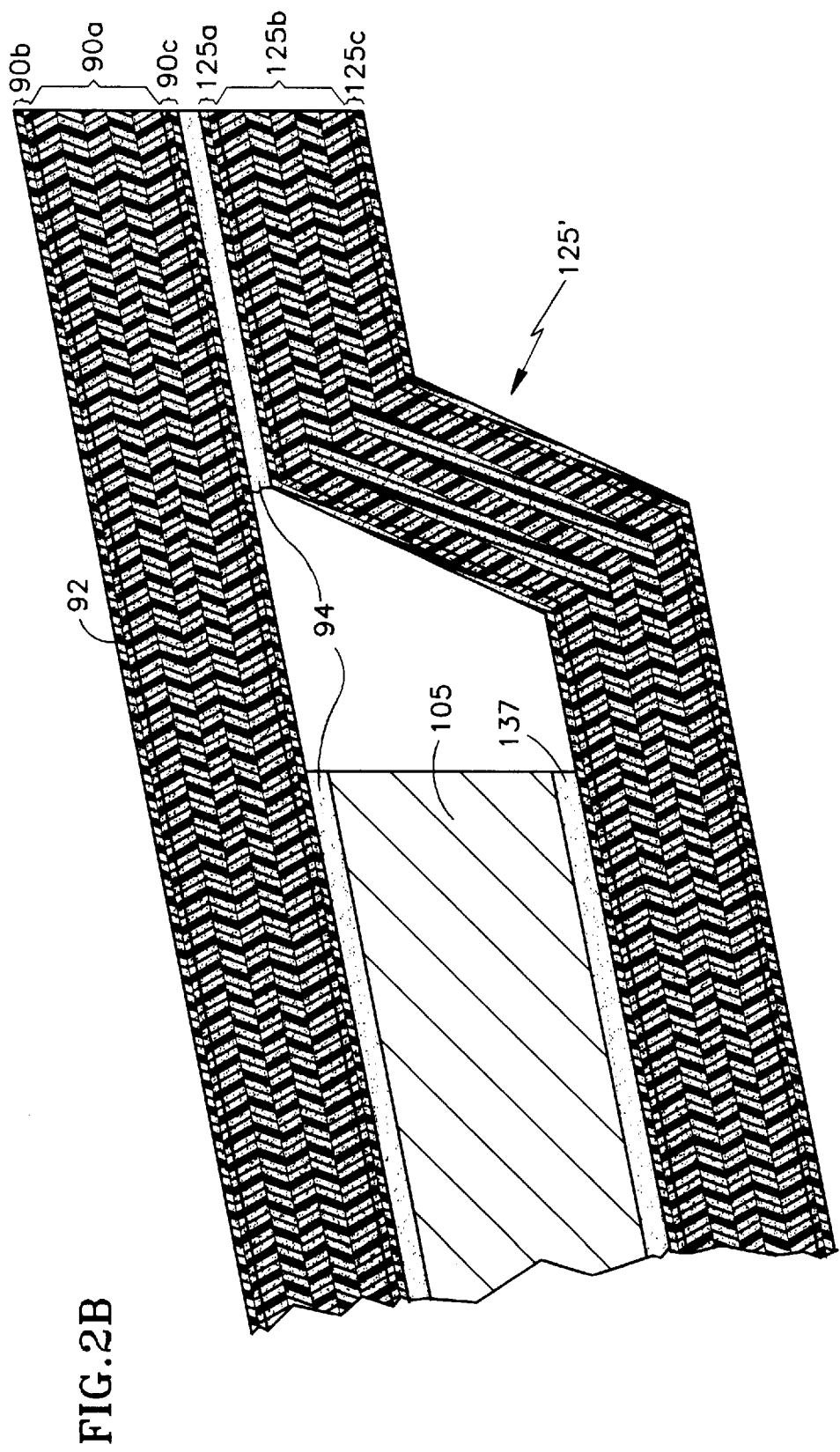
FIG. 2B is an alternate embodiment of the construction shown in FIG. 2A.

The outer ring 90 extends forward of the first circumferentially extending location 80 a first length, $L_1$ and rearward of the first circumferentially extending location 80 a second length $L_2$ to within close proximity of the fan rotor disk 120. The outer ring 90 completely encircles the aft fairing 105 and a portion of the inlet nose cone 15. As shown in FIG. 2A, and FIG. 2B, the outer ring 90 is composed of at least one layer of a carbon fibrous material 90a disposed between at least two layers 90b,c of glass fibrous material with both layers being bonded together by an epoxy resin. The carbon fibrous material has carbon fibers 92 that extend circumferentially. A bonding material 94 extends between the outer ring and the aft fairing and the inlet nose cone. The outer ring has a second stiffness to mass ratio that is greater than the first stiffness to mass ratio of the aft fairing 105 and the inlet nose cone 15. Examples of suitable materials for this combination of materials are available from the Hexcel Corporation, Livermore, Calif. as: T6C145 carbon fibrous material; style 120-38 glass fibrous material; and F-263 epoxy resin.

Figure 3:
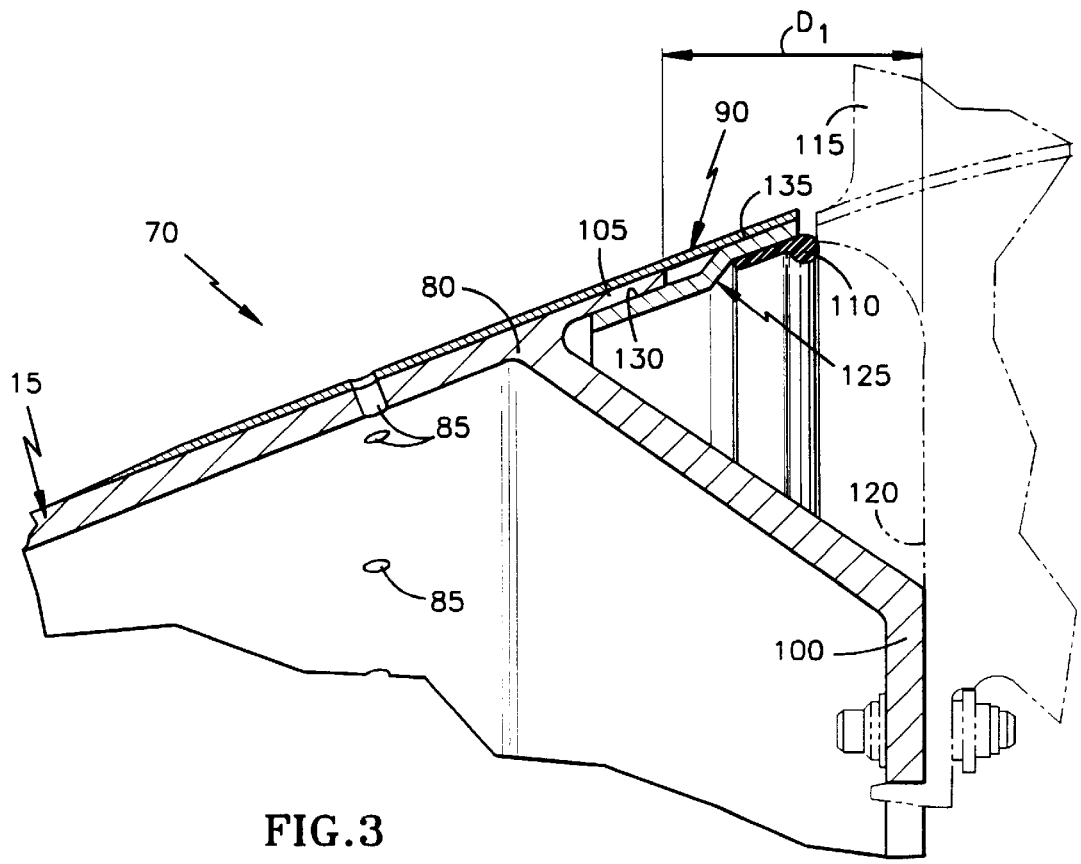
FIG. 3 a cross sectional view of a repaired composite inlet nose cone.
Figure 4:
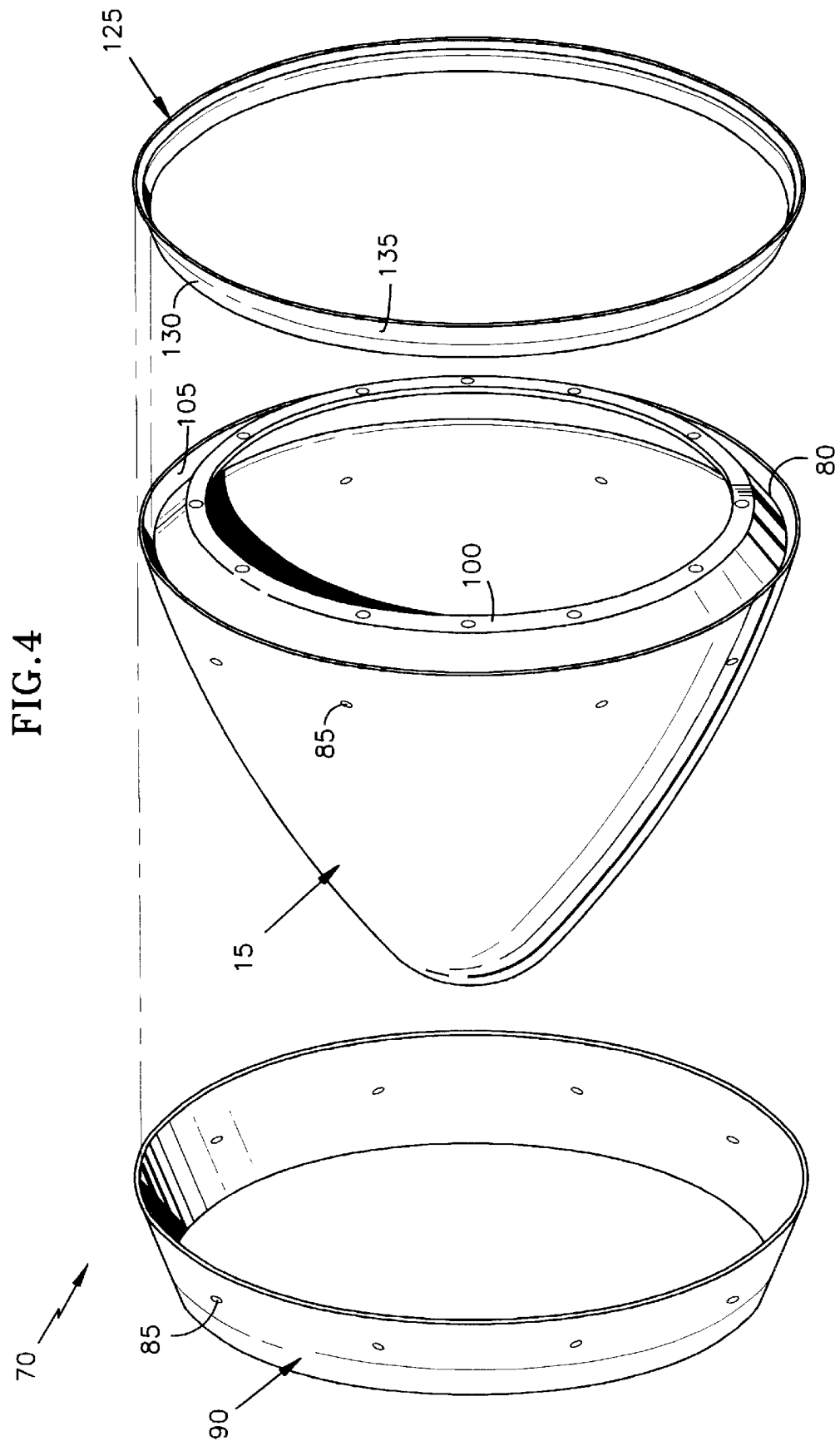
FIG. 4 an exploded side view of the repaired composite inlet nose cone shown in FIG. 3.

Referring now to FIG. 3 and FIG. 4, a repaired inlet nose cone assembly 70 is shown. The repaired inlet nose cone assembly includes a foreshortened aft fairing 105 that has a length $L_3$ that is shorter than the length of an unmodified aft fairing 105. The length $L_2$ of the outer ring is at least twice greater than the length $L_3$ of the aft fairing. The distance $D_1$ is the distance of the modified aft fairing from the flange end 100 and the distance $D_2$ is the distance of an unmodified aft fairing.

The inlet nose cone assembly also includes an inner ring 125 in addition to the parts disclosed in FIG. 2. The inner ring 125 is in the shape of a frustoconical section having a first part having a first surface 130 and a second part having a second surface 135. The inner ring has a third part 137 which is inclined outwardly from the first part to the second part such that the surfaces of the first and second parts are spaced radially one from the other and are each in faying relationship with the aft fairing and the outer ring 90. A bonding material 137 extends between the surfaces of the inner ring and the aft fairing. The bonding material 94 extends between the inner ring and the outer ring. The first surface 130 of the inner ring is attached to the foreshortened aft fairing 105 and the second surface 135 is attached to the outer ring 90. The outer ring 90 and the inner ring 125 extend to within close proximity of the fan blade 115. As shown in FIG. 2A, the bubble airseal 110 rests under the first surface 130 of the inner ring 125. The inner ring 125 is composed of glass fibrous layers 125a with at least one inner layers 125b of "kevlar"; material. As shown, the inner ring has layers of Kevlar materials. The inner ring has a third stiffness to mass ratio that is less than the second stiffness to mass ratio of the outer ring 90. Examples of suitable materials for this combination of materials are also available from the Hexcel Corporation, Livermore, Calif. as: style 120-38 glass fibrous material; K285 Kevlar material; and, D-126 epoxy resin. Alternatively as shown in FIG. 2B, the inner ring 125' may be a continuous inner ring formed of a Kevlar fibrous material 125b disposed between glass fibrous material 125a, 125c. The inner ring 125' has a lower stiffness to mass ratio than the outer ring.

During operation of the engine, working medium gases are drawn into the engine. As the gases approach the fan stage, the gases are flowed around the contour of the inlet nose cone 15. The gases are compressed in the fan section 55. A large percentage of the working medium gases are flowed into the secondary flowpath 50 and are exhausted to the atmosphere. The remainder of the working medium gases follow the primary flow path into the low pressure compressor 20 where the gases are further compressed.

The gases then enter the high pressure compressor 25 where again the gases are compressed raising the temperature and pressure of the working medium gases. The gases are flowed into the combustor 30, where they are mixed with fuel and burned. The hot gas mixture is flowed into the high pressure turbine 35 where work is extracted from the gas mixture. The high pressure turbine 35 transmits this work to the high pressure compressor 25. The gases are then flowed into the low pressure turbine 40 where still more useful work is extracted from the gases. The low pressure turbine transmits work to the low pressure compressor 20 and the fan section 55. Finally the gases are exhausted to the atmosphere.

The nose cone assembly 70 is rotated about the axis of rotation of the engine with the fan disk 120. The aft fairing 105 of the inlet nose cone 15 may deflect radially during engine operation in response to rotational forces in assemblies not having an outer ring. Continuous radial deflections cause the composite layers of the aft fairing 105 to delaminate if the nose cone assembly has handling or foreign object damage.

The method for repairing this delamination is as follows. First, a portion of the trailing edge of the aft fairing 105, a length $D_1$ that exceeds the axial length of the delamination, is removed. Next, the surfaces of the aft fairing 105 and the inlet nose cone 15 are abraded. A bonding medium (such as EA-9394 epoxy resin adhesive available from the Dexter Corporation, Hysol Division, Pittsburg, Calif. 94565) is applied to the inlet nose cone 15 and the aft fairing 105. The outer ring 90 is applied to the inlet nose cone 15 and the aft fairing 105 such that the outer ring 90 extends forward of the first circumferentially extending location 80 a first length, $L_1$ and rearward of the first circumferentially extending location 80 a second length, $L_2$ to within close proximity of the fan rotor disk. The bonding medium is allowed to cure for an appropriate amount of time. Next the bonding medium is applied to the interior surface of the outer ring 90 and the interior surface of aft fairing 105. The inner ring 125 is applied to the aft fairing 105 and the outer ring 90. The bonding medium is allowed to cure for an appropriate amount of time. Alternatively, a scrim supported epoxy resin adhesive might be used for the bonding material.

A particular embodiment of the present invention can be utilized to modify a nose cone assembly not having an outer ring 90 but that has a serviceable inlet nose cone 15. The procedure entails the following steps. First, the surfaces of the inlet nose cone 15 and the aft fairing 105 are abraded. A bonding medium, such as one of those discussed previously, is applied to the surfaces of the inlet nose cone 15 and the aft fairing 105. The outer ring 90 is applied to the inlet nose cone 15 and the aft fairing 105 such that the outer ring 90 extends forward of the first circumferentially extending location 80 a first length, $L_1$, and rearward of the first circumferentially extending location 80 a second length, $L_2$, to within close proximity of the fan rotor disk 120. The bonding medium is allowed to cure for an appropriate amount of time.

Another detailed embodiment of the present invention includes a repair kit for a delaminated composite inlet nose cone 15. The repair kit includes an outer ring 90 and an inner ring 125. The outer ring 90 is composed of a free-standing carbon fibrous and glass fibrous material combination that has a higher stiffness to mass ratio than the aft fairing 105. As mentioned, the inner ring 125 is composed of a Kevlar fibrous and glass fibrous material combination that has a lower stiffness to mass ratio than the outer ring 90 but may be higher than the aft fairing 105. It should also be noted that material substitution could be made for the outer ring 80 and inner ring 125 provided the stiffness to mass ratios as set forth above are met. The higher stiffness to mass ratio of the outer ring 90 gives the present invention several distinct advantages.

First, the higher stiffness to mass ratio enables the outer ring to constrain the radial deflections of the aft fairing 105 since the ring does not experience any significant radial deflections.

Second, the stiffness to mass characteristic of the outer ring 90 enables the outer ring 90 to constrain the aft fairing while having a cross sectional profile that is thin in comparison with the aft fairing 105 or the inlet nose cone 15. This is particularly important for nose cone assemblies that are modified, serviceable nose cone assemblies. The thin profile does not significantly change the center of gravity of the inlet nose cone assembly and thus does not significantly increase the distribution of centrifugal forces exerted on the inlet nose cone assembly. Also the thin profile of the outer ring 90 in comparison with the inlet nose cone 15 allows for a smooth flowpath around the inlet nose cone 15 and the aft fairing 105.

Another advantage of the present invention is that the adhesive bonds of the inner ring 125 and the outer ring 90 are in compression during engine operation. The compressive force of the inner ring 125 results from the lower stiffness to mass ratio of the inner ring 125 in comparison with the outer ring. The compressive force exerted by the outer ring 90 results from the stiffness of the outer ring 90 as compared with the inlet nose cone 15 and the aft fairing 105. The adhesive bonds exhibit the greatest strength in compression while they exhibit the least in tension. The outer ring and inner ring place the bonds in a condition in which the maximum strength of the bonds can be utilized. The mass (or mass characteristic of a specific embodiment) may be adjusted to ensure the mass provides the necessary compressive force.

The inner ring may or may not be circumferentially continuous. There is an advantage to having an inner ring which is circumferentially continuous. The stiffness to mass characteristic ensures the force stays within acceptable values over the entire range of rotational speeds which are experienced during normal operative conditions.

Another particular advantage of the present invention is the distribution of the radial force transmitted through the flange 100 from the fan rotor disk 120. During operation of the engine, the fan rotor disk 120 grows and thus applies force to the flange 100. The location of the outer ring 90 helps to distribute this force. The outer ring 90 extends forward of the first circumferentially extending location 80 a first length that is greater than the second length that extends aft of the first circumferentially extending location 80. This greater length helps to distribute the forces that are applied to the inlet nose cone 15 through the flange 100 and reduces the forces taken out through the aft fairing, thereby reducing the stress placed on the adhesive bonds between the outer ring 90 and the inlet nose cone 15 and in particular between the aft fairing and the outer ring.

Although this invention has been shown and described with respect to the detailed embodiments thereof, it will be understood by those skilled in the art that various changes in the form and detail thereof may be made without departing from the spirit and scope of the claimed invention.

What is claimed is:

1. An inlet nose cone assembly for an axial flow rotary machine having a flowpath for working medium gases and a fan rotor assembly that includes a fan rotor disk and a plurality of fan blades that extend radially outwardly from the fan rotor disk across the working medium flowpath, the inlet nose cone assembly comprising:

an inlet nose cone formed of a composite material having
an interior surface,
an exterior surface,
a first circumferentially extending location and
a flange extending radially inward from the first circumferentially extending location that is attached to the fan rotor disk and which is adapted to transmit an outward radial force from the fan rotor disk to the inlet nose cone;

an aft fairing formed of a composite material having a first stiffness to mass ratio, the aft fairing being integral with the inlet nose cone and extending in cantilevered fashion rearward from the first circumferentially extending location, the aft fairing having
an interior surface and
an exterior surface, a circumferentially continuous outer ring formed of a material having a second stiffness to mass ratio that is greater than the first stiffness to mass ratio of the aft fairing, the outer ring having
an interior surface attached to the exterior surface of the aft fairing and the exterior surface of the inlet nose cone, through an area of attachment A, and
an exterior surface, wherein under operative conditions the inlet nose cone and aft fairing are subjected to rotational forces and wherein the fan rotor disk grows outwardly in response to rotational forces on the fan rotor disk and exerts the outward radial force on the flange of the inlet nose cone and wherein the outer ring extends forwardly of the first circumferentially extending location a first length, $L_1$, such that the length $L_1$ enables the radial force transmitted through the flange to be resisted over a distributed area, the outer ring also extending rearwardly of the first circumferentially extending location a second length, $L_2$, to within close proximity of the fan rotor disk such that radial deflections of the aft fairing are resisted under said operative conditions by the outer ring and the exterior surface of the outer ring bounds the working medium flowpath enabling the working medium gases to flow smoothly into the fan blades.

2. The inlet nose cone assembly as recited in claim 1, further comprising:

an inner ring formed of a material having a preselected mass, the inner ring having
a first part having a first surface facing outwardly which is attached to the interior surface of the aft fairing over an area $A_1$,
a second part having a second surface facing outwardly which is attached to the interior surface of the outer ring over an area $A_2$;
wherein under said operative conditions, the first part is urged outwardly in response to rotational forces such that the area of attachment $A_1$ between the inner ring and the aft fairing is held in compression and wherein the second part is urged outwardly in response to rotational forces such that the area of attachment, $A_2$ between the outer ring and the inner ring, is held in compression.

3. The inlet nose cone assembly as recited in claim 2 wherein the inner ring is circumferentially continuous and has a third stiffness to mass ratio that is less than the second stiffness to mass ratio of the outer ring and wherein the mass characteristic and the stiffness to mass characteristic of the inner ring avoids the inner ring exerting more than a preselected compressive force through the first and second parts of the inner ring on the aft fairing and the outer ring at rotational speeds encountered under normal operative conditions of the machine.

4. The inlet nose cone assembly as recited in claim 3 wherein the aft fairing extends rearwardly a distance $L_3$ from the first location and wherein the distance $L_2$ which the outer ring extends rearwardly is at least twice the distance $L_3$ and wherein the inner ring has a third part which is inclined outwardly from the first part to the second part of the inner ring such that the first and second parts of the inner ring have surfaces that are spaced radially one from the other and are each in faying relationship with the aft fairing and the outer ring.

5. The inlet nose cone assembly as recited in claim 2 wherein the aft fairing extends rearwardly a distance $L_3$ from the first location and wherein the distance $L_2$ which the outer ring extends rearwardly is at least twice the distance $L_3$ and wherein the inner ring has a third part which is inclined outwardly from the first part to the second part of the inner ring such that the first and second parts of the inner ring have surfaces that are spaced radially one from the other and are each in faying relationship with the aft fairing and the outer ring.

6. The inlet nose cone assembly as recited in claim 1 wherein the forward length $L_1$ of the outer ring is greater than the aft length $L_2$ of the outer ring such that the length $L_1$ extends the outer ring forwardly to extend forwardly the region of resistance of the outer ring to the force which is exerted by the flange on nose cone and on the aft fairing and to decrease the force acting on the outer ring over the length $L_2$ through the aft fairing decreasing the strain in the aft fairing under said operative conditions.

7. The inlet nose cone assembly as recited in claim 2 wherein the forward length $L_1$ of the outer ring is greater than the aft length $L_2$ of the outer ring such that the length $L_1$ extends the outer ring forwardly to extend forwardly the region of resistance of the outer ring to the force which is exerted by the flange on nose cone and on the aft fairing and to decrease the force acting on the outer ring over the length $L_2$ through the aft fairing decreasing the strain in the aft fairing under said operative conditions.

8. The inlet nose cone assembly as recited in claim 3 wherein the forward length $L_1$ of the outer ring is greater than the aft length $L_2$ of the outer ring such that the length $L_1$ extends the outer ring forwardly to extend forwardly the region of resistance of the outer ring to the force which is exerted by the flange on nose cone and on the aft fairing and to decrease the force acting on the outer ring over the length $L_2$ through the aft fairing decreasing the strain in the aft fairing under said operative conditions.

9. The inlet nose cone assembly as recited in claim 4 wherein the forward length $L_1$ of the outer ring is greater than the aft length $L_2$ of the outer ring such that the length $L_1$ extends the outer ring forwardly to extend forwardly the region of resistance of the outer ring to the force which is exerted by the flange on nose cone and on the aft fairing and to decrease the force acting on the outer ring over the length $L_2$ through the aft fairing decreasing the strain in the aft fairing under said operative conditions.

10. The inlet nose cone assembly as claimed in claim 1 wherein the outer ring is formed of at least two layers of glass fibrous material and a carbon fibrous material disposed between at least a portion of the layers of glass fibrous material, the carbon fibrous material having carbon fibers that extend circumferentially and wherein the outer ring has an epoxy resin disposed about the glass and carbon fibrous materials.

11. The inlet nose cone assembly as claimed in claim 2 wherein the outer ring is formed of at least two layers of glass fibrous material and a carbon fibrous material disposed between at least a portion of the layers of glass fibrous material, the carbon fibrous material having carbon fibers that extend circumferentially and wherein the outer ring has an epoxy resin disposed about the glass and carbon fibrous materials.

12. The inlet nose cone assembly as claimed in claim 3 wherein the outer ring is formed of at least two layers of glass fibrous material and a carbon fibrous material disposed between at least a portion of the layers of glass fibrous material, the carbon fibrous material having carbon fibers that extend circumferentially and wherein the outer ring has an epoxy resin disposed about the glass and carbon fibrous materials.

13. The inlet nose cone assembly as claimed in claim 2 wherein the inner ring is formed of a glass fibrous material and has at least one layer of Kevlar material disposed about the inner diameter of the inner ring and wherein the inner ring has an epoxy resin disposed about the glass and Kevlar fibrous materials.

14. The inlet nose cone assembly as claimed in claim 3 wherein the inner ring is formed of a glass fibrous material and has at least one layer of Kevlar material disposed about the inner diameter of the inner ring and wherein the inner ring has an epoxy resin disposed about the glass and Kevlar fibrous materials.

15. The inlet nose cone assembly as claimed in claim 1 wherein the outer ring is attached to the inlet nose cone and the aft fairing by a bonding medium.

16. The inlet nose cone assembly as claimed in claim 2 wherein the first surface of the inner ring is attached to the interior surface of the aft fairing by a bonding medium, the second surface of the inner ring is attached to the interior surface of the outer ring by a bonding medium.

17. The inlet nose cone assembly as claimed in claim 15 wherein the bonding medium for the outer ring is selected from the group consisting of an epoxy adhesive paste or a scrim supported epoxy adhesive film.

18. The inlet nose cone assembly of claim 16 wherein the bonding medium for the inner ring is selected from the group consisting of an epoxy adhesive paste or a scrim supported epoxy adhesive film.

19. The inlet nose cone assembly as claimed in claim 1 wherein the inlet nose cone has a plurality of holes arranged circumferentially such that the interior surface of the inlet nose cone is placed in fluid communication with the exterior surface of the inlet nose cone.

20. The inlet nose cone assembly as claimed in claim 1 wherein the inlet nose cone has a plurality of circumferentially spaced holes and wherein the outer ring has a plurality of circumferentially spaced holes aligned with the circumferential holes of the inlet nose cone.

21. The inlet nose cone as claimed in claim 1 wherein the flange is bolted to the fan rotor disk.

22. A kit for repairing delaminations to an inlet nose cone assembly, the inlet nose cone assembly having an inlet nose cone formed of a composite material, an aft fairing formed of a composite material having a first stiffness to mass ratio, the aft fairing being integral with the inlet nose cone and extending in a cantilevered fashion from the inlet nose cone, a first circumferentially extending location and a flange extending radially inward from the first circumferentially extending location, the kit comprising:

a circumferentially continuous outer ring formed of a material having a second stiffness to mass ratio that is greater than the first stiffness to mass ratio of the aft fairing, the outer ring being adapted to extend forward of the first circumferentially extending location a first length, $L_1$, and rearward of the first circumferentially extending location a second length, $L_2$, and;

a circumferentially continuous inner ring formed of a material having a third stiffness to mass ratio that is less than the second stiffness to mass ratio of the outer ring, the inner ring being in the form of a frustoconical section having a first surface, a second surface and an inclined surface connecting the first surface to the second surface, the inner ring being adapted such that the first surface contacts the aft fairing along an area $A_1$ and the second surface contacts the outer ring along an area $A_2$ and wherein the mass characteristic and the stiffness to mass characteristic of the inner ring is adapted to avoid in the installed condition the inner ring exerting more than a preselected compressive force through the first and second parts of the inner ring on the aft fairing and the outer ring at rotational speeds encountered under normal operative speeds of the machine.

23. A method for repairing an inlet nose cone assembly of an axial flow rotary machine, the inlet nose cone assembly having an inlet nose cone, an aft fairing that has a first stiffness to mass ratio and that has undergone delaminations, which are of an axial length $L_d$, a flange and a first circumferentially extending location, the method comprising:

a) removing a length $D_1$ from the trailing edge of the aft fairing, $D_1$ being greater than the axial length $L_d$ of the delaminations;

b) abrading the surface of the inlet nose cone and the aft fairing;

c) applying a bonding medium to the inlet nose cone and the aft fairing;

d) forming an outer ring from a material having a second stiffness to mass ratio that is greater than the first stiffness to mass ratio of the aft fairing, the outer ring adapted to extend forward of the first circumferentially extending location a first length, $L_1$, and rearward of the first circumferentially extending location a second length, $L_2$, e) applying the outer ring to the inlet nose cone and the aft fairing;

f) allowing the bonding medium to cure for a length of time;

g) applying an adhesive medium to the interior surface of the aft fairing and to the interior surface of the outer ring;

h) forming an inner ring from a material having a third stiffness to mass ratio that is less than the second stiffness to mass ratio of the outer ring, the inner ring having a first part having a first surface, a second part having a second surface and a third part inclined outwardly from the first part to the second part connecting the first surface to the second surface, the inner ring being adapted such that the first surface contacts the aft fairing along an area $A_1$ and the second surface is spaced radially from the first surface and contacts the outer ring along an area $A_2$;

i) applying the inner ring to the aft fairing and the outer ring;

j) allowing the adhesive medium to cure for a length of time.

24. An inlet nose cone assembly for an axial flow rotary machine having a working medium gas flow path and a fan rotor assembly that includes a fan rotor disk and a plurality of fan blades that extend radially across the working medium gas flowpath, the inlet nose cone assembly comprising:

an inlet nose cone formed of a composite material, the inlet nose cone having
an interior surface,
an exterior surface,
a first circumferentially extending location,
a flange extending radially inward from the first circumferentially extending location which is attached to the fan rotor disk and
a plurality of holes arranged circumferentially such that the interior surface of the inlet nose cone is placed in fluid communication with the exterior surface of the inlet nose cone, an aft fairing formed of a composite material integral with the inlet nose cone, the aft fairing having
an interior surface and
an exterior surface, wherein the aft fairing extends in cantilevered fashion from the first circumferentially extending location such that the working medium gases flow smoothly into the fan blades;

a continuous outer ring formed of a carbon fibrous material having a higher stiffness to mass ratio than the aft fairing, the outer ring having
an interior surface,
an exterior surface and
circumferentially arranged holes aligned with the circumferential holes of the inlet nose cone, wherein the interior surface of the outer ring is attached to the exterior surface of the aft fairing and the exterior surface of the inlet nose cone, the outer ring extending forward of the first circumferentially extending location a first length, $L_1$, and rearward of the first circumferentially extending location a second length, $L_2$, to within close proximity of the fan rotor disk such that radial deflections of the aft fairing are constrained, the outer ring being attached to the inlet nose cone and the aft fairing by a bonding medium;

a continuous inner ring formed of a Kevlar fibrous material disposed between a glass fibrous material having a lower stiffness to mass ratio than the outer ring, the inner ring being in the form of a frustoconical section having
a first surface,
a second surface and
an inclined surface extending angularly from the first surface to the second surface, wherein the first surface is bonded to the interior surface of the aft fairing such that the bond between the aft fairing and the outer ring is held in compression and the second surface is bonded to the interior surface of the outer ring such that the bond between the second surface and the outer ring is held in compression under operative conditions.

* * * * *